United States Patent [19]
Lopez

[11] 4,151,672
[45] May 1, 1979

[54] FISHING ROD

[76] Inventor: David L. Lopez, 14324 Spring Oaks Dr., Balch Springs, Tex. 75180

[21] Appl. No.: 888,215

[22] Filed: Mar. 20, 1978

[51] Int. Cl.² .............................................. A01K 87/00
[52] U.S. Cl. .................................................... 43/18 R
[58] Field of Search .................... 43/18 R, 18 GF, 15, 43/24

[56] References Cited

U.S. PATENT DOCUMENTS

| 2,620,586 | 12/1952 | Seifert | 43/24 |
| 3,088,239 | 5/1963 | Weaver | 43/18 R |
| 4,121,369 | 10/1978 | Lopez | 43/18 R |

FOREIGN PATENT DOCUMENTS 2328001  12/1973  Fed. Rep. of Germany .............. 43/15

Primary Examiner—Nicholas P. Godici
Attorney, Agent, or Firm—Peter J. Murphy

[57] ABSTRACT

An elongated hollow tapered shaft, preferably of fiberglass construction, receives an elongated wire insert fabricated from steel wire for example. The insert includes a head formed at its base end to engage and bind with the interior wall of the base end of the shaft, to limit movement of the insert into the shaft; and this head provides a hook for attaching one end of an elastic line. The insert is somewhat shorter than the shaft and has an attachment loop formed adjacent to the tip end. A fishing line is attached to the attachment loop, extends toward the base end and passes through a ring attached to the free end of the elastic line, with the fishing line then extending toward and beyond the tip end of the shaft. The elastic line withdraws a storage loop of fishing line between the attachment loop and the attachment hook of the insert, which storage loop allows for a variable length of fishing line extending beyond the tip of the fishing rod. An external finger, attached to the tip end of the shaft, coacts with a locking loop formed in the fishing line, to limit withdrawal of line into the shaft and, therefore, to fix the length of line which extends from the end of the fishing rod.

9 Claims, 4 Drawing Figures

FISHING ROD

BACKGROUND AND SUMMARY OF THE INVENTION

This invention relates to an inexpensive fishing rod having internal line attachment and storage means for changing the length of line extending from the tip of the rod.

A principal object of this invention is to provide an inexpensive fishing rod having attached fishing line, and having line storage means by which the user may easily change the length of fishing line extending from the tip of the rod.

Another object of this invention is to provide an inexpensive fishing rod and line assembly which is particularly suited to be used by novice fishermen and children for still fishing for small fish such as crappies or perch.

A further object of this invention is to provide such a fishing rod and line assembly which is simple in design and inexpensive to manufacture and assemble.

Still another object of this invention is to provide such a fishing rod wherein the line attaching and line storage means is an insert confined within a hollow shaft, and which insert is readily removed to repair or replace the fishing line.

A still further object of this invention is to provide a unique fishing rod having an attached fishing line of fixed length, wherein the length of line extending from the rod tip can be increased greater than the length of the rod.

Another object of this invention is to provide such a fishing rod and adjustable line assembly which is very easy to use by novice fishermen.

For accomplishing these objects, a fishing rod according to the invention comprises an elongated hollow shaft having a base end and a tip end, and an elongated stiff insert disposed within the shaft having a base end and a tip end. The insert has attachment means at its base end for attaching a line thereto, and has attachment means adjacent to its tip end for attaching a line thereto. One end of a length of elastic line is attached to the base end attachment means and a ring is attached to its other end. The elastic line has a contracted length much shorter than the distance between the base end and the tip end attachment means. A length of fishing line has one end attached to the tip end attachment means, then passes through the ring and extends from the ring toward and beyond the tip end of the shaft. The insert, together with the attached line, is removable from the shaft at its base end.

In more detail, a fishing rod according to the invention includes a finger projecting axially from the tip end of the shaft, for receiving a loop formed in the fishing line for the purpose of limiting withdrawl of the fishing line into the interior of the shaft by the elastic line. The insert base end has an enlarged head dimensioned for engagement with the inner wall of the shaft base end, to limit movement of the insert into the shaft.

The novel features and the advantages of the invention as well as additional objects thereof, will be understood more fully from the following description when read in connection with the accompanying drawing.

DRAWING

DESCRIPTION OF THE PREFERRED EMBODIMENT

The basic elements of a preferred form of fishing rod according to the invention are a hollow shaft 10 and an elongated, stiff insert 20. The shaft 10 is preferably fabricated from a figerglass reinforced plastic material, and is tapered with the larger end being the base end and the smaller end being the tip end. While the length for the shaft 10 may be selected as desired, for purposes of describing relative dimensions of the shaft and insert in the following description a shaft length of about 9 feet will be assumed as an example of desired rod length.

The insert 20 may be fabricated from any suitable material such as 3/32 inch steel wire. The insert will be shorter in overall length than the shaft 10; and an overall length of 8 feet is assumed for the following description.

Figure 1:
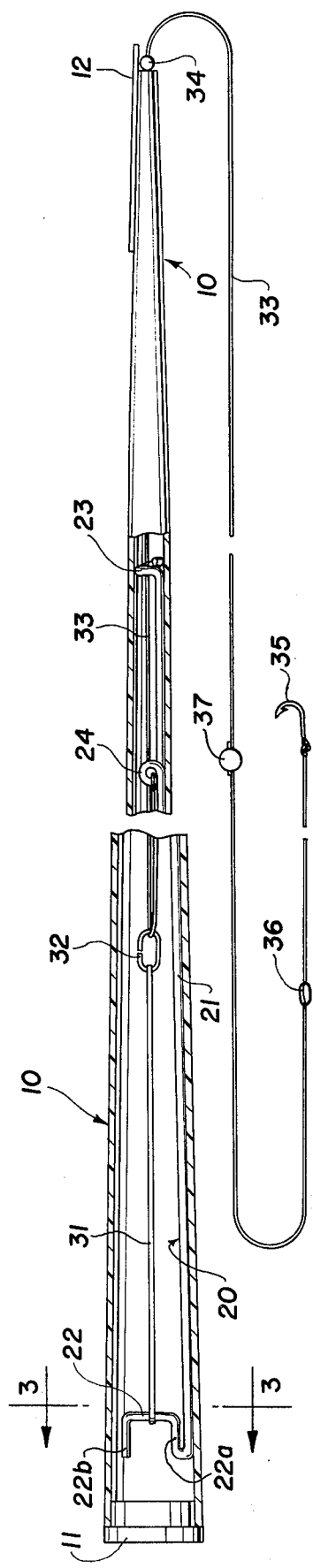
FIG. 1 is a side view of a rod according to the invention, broken and partially in longitudinal section, illustrating the minimum line extension condition.

The insert 20 includes a main linear stem 21 having a head 22 formed at its base end and which includes an attachment hook. The insert further includes a transverse eye 23 formed at its tip end, and an attachment loop 24 formed in an axial plane adjacent to the tip end. The head 22, as best seen in FIG. 1, is formed to provide two axial legs 22a and 22b which, together with the stem 21 define three triangularly spaced legs which engage the inner wall at the base end of the shaft 10 to limit movement of the insert 20 into the tapered shaft. It will be seen that the insert 20 is fully enclosed within the tapered shaft; and the base end of the shaft may be closed by an end plug 11. The end plug 11 is dimensioned for a friction fit within the base end of the shaft, to be removable for the purpose of removing the insert 20 when necessary.

Figure 4:
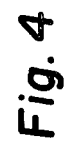
FIG. 4 is a fragmentary view of the tip end of the rod insert.
Figure 3:
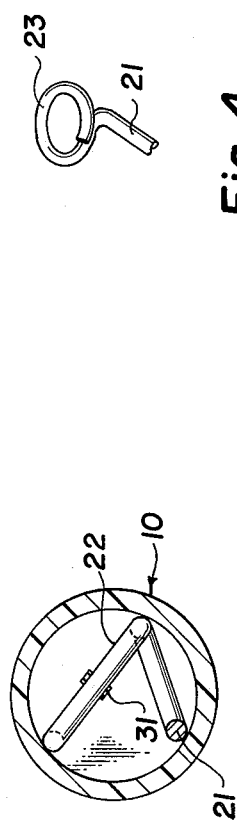
FIG. 3 is a transverse sectional view illustrating the head of the rod insert.

The tip eye 23 is preferably formed as an overlapping coil as best seen in FIG. 4 to form a guide for the fishing line 23 in a manner that the line cannot become pinched or abraded while passing through the eye 23. The outer diameter of the eye 23 may be sized to engage or bind with the interior wall of the shaft 10, to confine or stabilize the tip end of the insert 20.

Figure 2:
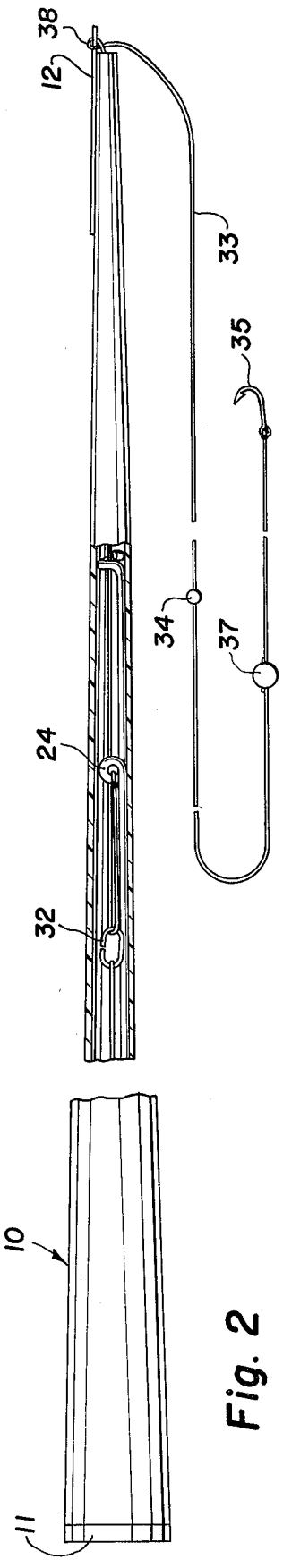
FIG. 2 is another side view of the rod, broken and partially in longitudinally section, illustrating the nearly maximum line extension condition.

FIGS. 1 and 2 of the drawings are broken views illustrating only relatively small portions of the base end and the tip end of the rod assembly. With the assumed dimensions the distance between the insert head 22 and attachment loop 24 would be about 7½ feet and the distance between the attachment loop 24 and tip eye 23 would be about ½ foot for example.

A length of elastic line 31 is attached at one end to the attachment hook 22 and has a ring 32, preferably ovaloid or elongated in shape, attached to its other end. The length of fishing line 33 is attached at one end to the attachment loop 24; and the line then extends rearwardly passing through the ring 32 then forwardly passing through the insert eye 23 and then through the tip end of the shaft 10. An enlargement or stop 34 is fixed to the fishing line 33 intermediate its ends, for a purpose to be described; and the line has attached at its distal end the usual hook 35, sinker 36, and bobber 37.

FIG. 1 illustrates the minimum line extension condition of the rod and line assembly in which the stop 34 limits the withdrawl of line into the interior of the rod, and in which the elastic line 31 is in a state of maximum contraction. Considering the assumed dimensions, the length of the elastic line in the condition may be about 1½ feet; and accordingly, the distance between the attachment loop 24 and the ring 32 is about 6 feet. In the condition, the elastic line and ring 23 produce a storage loop of fishing line between the attachment loop 24 and the ring 23 which amounts to 12 feet of line. In this condition also the amount of line extending from the tip end of the rod shaft may be a selected length such as 6 feet for example.

For the maximum extension condition of the rod assembly, the line 33 will be withdrawn from the rod tip end to the point where the ring 32 is positioned at the attachment loop 24, and the elastic line 31 will then be extended about 7½ feet. In this condition, obviously the length of line extending from the rod tip is increased by 12 feet to a total of 18 feet. The length of line extending from the rod tip may be selected by the user as desired at any length between the minimum and the maximum. FIG. 2 illustrates the condition where the line extension is nearly a miximum, that is with the ring 32 being positioned quite close to the attachment loop 24. To secure the line in this or any immediate extension condition, a retaining finger 12 is fixed to the shaft at its tip end, and projects slightly beyond the tip end, about 1 inch for example. When the line 33 is withdrawn the desired amount, a loop 38 is formed in the line and slipped over the finger 12 as illustrated in FIG. 2, and the loop will then bind itself to prevent further withdrawl of the line into the shaft by the elastic line 31. The line will remain in this condition either until it is changed by the user, or until a fish takes the bait. When a fish takes the bait it will pull the line loop 38 off the finger 12, and the user will then use his skills to retrieve the fish. When the line is withdrawn from the finger 12, the contraction of the elastic line 31 may serve to help set the hook in the fish.

FEATURES AND ADVANTAGES

A principal feature and advantage of the invention is that it provides a complete and very inexpensive fishing rod and line assembly, the assembly having means for substantial variation of the length of fishing line extending from the tip of the rod as desired by the user. The availability of such an inexpensive fishing rod assembly contributes to the enjoyment of the fishing experience by novice fishermen as well as other fishermen.

An important feature of the invention is that the rod insert is readily removable from the shaft for the purpose of repairing the assembly, in the event that the fishing line or elastic line becomes broken or abraded or worn; and also in the event that the user desires to attach a longer length of line to the assembly.

Another feature and advantage of the invention is that the rod assembly is very easy to use either by children or others, particularly with respect to changing the desired length of line which extends from the rod tip.

While the preferred embodiment of the invention has been illustrated and described, it will be understood by those skilled in the art that changes and modifications may be resorted to without departing from the spirit and scope of the invention.

What is claimed is:

1. A fishing rod comprising
an elongated hollow shaft having a base end and a tip end;
an elongated, stiff insert disposed within said shaft, having a base end and a tip end;
said insert having base end attachment means at its base end for attaching a line thereto, and having tip end attachment means adjacent to its tip end for attaching a line thereto;
a length of elastic line having one end attached to said base end attachment means; a ring attached to the other end of said elastic line; said elastic line having a contracted length much shorter than the distance between said base end and tip end attachment means;
a length of fishing line having one end attached to said tip end attachment means; said line passing through said ring, and extending from said ring toward and beyond the tip end of said shaft;
and said insert, together with said attached lines, being removable from said base end of said shaft.

2. A fishing rod as set forth in claim 1
a line retaining finger projecting axially from said shaft at its tip end, for receiving a loop formed in said fishing line to limit withdrawal of said fishing line into the shaft interior by said elastic line.

3. A fishing rod as set forth in claim 1
stop means fixed to said fishing line and coacting with the tip end of said shaft to limit the withdrawal of said fishing line into said shaft.

4. A fishing rod as set forth in claim 1
the longitudinal distance between said base end attachment means and said tip end attachment means comprising a substantial portion of the overall length of said shaft.

5. A fishing rod as set forth in claim 1
said shaft being fabricated from fiberglass, and being tapered with its larger end defining said base end.

6. A fishing rod as set forth in claim 1
said insert base end having an enlarged head dimensioned for engagement with the inner wall of said shaft base end, to limit movement of said insert into said shaft.

7. A fishing rod as set forth in claim 1
said insert having an eye at said tip end for guiding said fishing line.

8. A fishing rod as set forth in claim 7
said eye engaging the interior wall of said shaft to stabilize said insert within said shaft.

9. A fishing rod as set forth in claim 1
said insert being fabricated from steel wire.

* * * * *